United States Patent
Gaffney et al.

[11] 3,714,310
[45] Jan. 30, 1973

[54] METHOD FOR MAKING RETICULATED TUBULAR NET

[75] Inventors: Bernard J. Gaffney; Robert Lee Gaffney, Stillwater, Mich.

[73] Assignee: Conwed Corporation

[22] Filed: Oct. 30, 1970

[21] Appl. No.: 85,324

Related U.S. Application Data

[63] Continuation-in-part of Ser. No. 51,060, June 30, 1972, abandoned.

[52] U.S. Cl. .................264/89, 83/7, 83/11, 264/95, 264/154, 264/167, 264/209, 264/210 R
[51] Int. Cl. ......B26d 3/16, B29c 17/14, B29d 23/04
[58] Field of Search......264/145, 138, 150, 167, 177, 264/209, 210 R, 95, 89; 18/14 V; 425/289; 83/11, 7

[56] References Cited

UNITED STATES PATENTS

| | | |
|---|---|---|
| 3,387,069 | 6/1968 | Stöhr..................................18/14 V |
| 3,329,998 | 7/1967 | Stöhr..................................18/14 V |
| 3,252,181 | 5/1966 | Hureau................................264/167 |
| 3,086,246 | 4/1963 | Stone .................................264/145 |

Primary Examiner—Robert F. White
Assistant Examiner—Jeffery R. Thurlow
Attorney—Eyre, Mann & Lucas

[57] ABSTRACT

A tube is extruded through a die and then partially severed on each side as the extruded item is moved away from the die. The cuts made on one side may be vertically spaced from the cuts made on the other side of the tube or sheet. The partially severed product is then unfolded to produce a thinner tube than that originally extruded. To produce a net structure, the die extrusion orifice is partially obstructed at a plurality of points to extrude a tube having continuous axial openings or bores contained within its wall. The tube may then be cut and unfolded to form a net structure having openings therein which correspond to the shape of the obstruction placed in the orifice or depending upon the way in which the cutting is carried out a double wall met may be produced.

5 Claims, 13 Drawing Figures

PATENTED JAN 30 1973 3,714,310

INVENTORS.
DR. BERNARD J. GAFFNEY &
ROBERT LEE GAFFNEY
BY Eyre, Mann & Lucas
ATTORNEYS INVENTORS.
DR. BERNARD J. GAFFNEY &
ROBERT LEE GAFFNEY
BY Eyre, Mann & Lucas
ATTORNEYS

PATENTED JAN 30 1973

INVENTORS.
DR. BERNARD J. GAFFNEY &
ROBERT LEE GAFFNEY

BY Eyre, Mann & Lucas

ATTORNEYS

METHOD FOR MAKING RETICULATED TUBULAR NET

This application is a continuation-in-part of an earlier filed application, Ser. No. 51,060 filed June 30, 1970, now abandoned.

In accordance with the present invention, a solid sheet of extrudable material which is preferably a plastic polymer such as polypropylene is continuously extruded and preferably cut on both sides as the extruded product moves away from the die. The cuts made on one side are vertically spaced from the cuts made on the other side and the depth of the cut determines the thickness of the final product. The partially severed product resembles an accordian which is unfolded by applying axial tension by conventional means to produce the final product which is thin as compared to the extruded form. For best results, the uncut wall thickness and the distance between successive cuts should be equal in order to produce a final structure having uniform thickness throughout. If desired, the cutting may be employed to provide surface decoration and in such case the surface decoration may only be cut into one side of the extruded product. A variety of surface decorations with different geometry may be achieved depending upon the way in which the cutting knives are manipulated.

To produce a net structure, the extrusion orifice is partially obstructed at one or more locations so that the wall of the solid sheet or tube is extruded with one or more bores of predetermined shape running axially along its length. The bore is completely contained within the wall of the extruding product. By alternately cutting into each side of the tube or sheet, through the bore but only partially into the remaining wall section, a net structure is formed when the partially severed tube or sheet is unfolded in axial direction. The shape and size of the openings in the net structure will be determined by the shape and size of the bore which in turn depends on the shape and size of the obstruction placed in the orifice. In another embodiment of the present invention, the cuts do not extend very deep into the product and the cut may only penetrate through the wall at one side of the product. In such case a double wall net is produced. The form of the cut may be varied from a slit to a wide open cut which removes a substantial portion of the side wall of the product. The selected type of cutting will depend upon the objective at hand.

Any type of conventional cutting means, such as knives, heat or laser beams, may be used for cutting the extruded polymer. However, knives are preferred. At least two knives are preferably used; one placed on each side of the extruding product. The knives may be individually moved in a regular or irregular sequence or the knives may be reciprocated as a unit by conventional means such as a rack and pinion or cam arrangement with appropriate means provided to control the depth of the cut.

The size and configuration of the cutting edge of the knife is selected to give the desired type of cut and when the product is to be slit across its width, the length of each knife may be equal to the width of the extruded product. Alternatively, a very short dagger type blade may be employed which is set for the desired depth of cut and then moved in known manner along with the extruded product and at the same time across the width of the product. In such case, the knife travels at an angle relative to the face of the product so as to compensate for the movement of the extruded product. As a result, the cut will be straight across the face of the product and at a right angle to the edges of the product along each side. The very short dagger type of blade may be most conveniently used for cutting surface decorations into the exterior wall of the product. In another embodiment of the invention, the knives are positioned to slide in contact with the exterior surface of the lips of the extrusion die between a first position moved from the opening in the die and a second position in which the knife obstructs a portion of the opening of the die to interrupt the flow of polymer and thereby cut a hole or void in the product. In this case the cutting into the wall of the product is achieved by cutting off the flow of polymer in the area of the die opening obstructed by the knife when in its second position.

Referring now to the drawings in which various preferred embodiments are depicted and in which like numerals refer to like parts:

Figure 1:
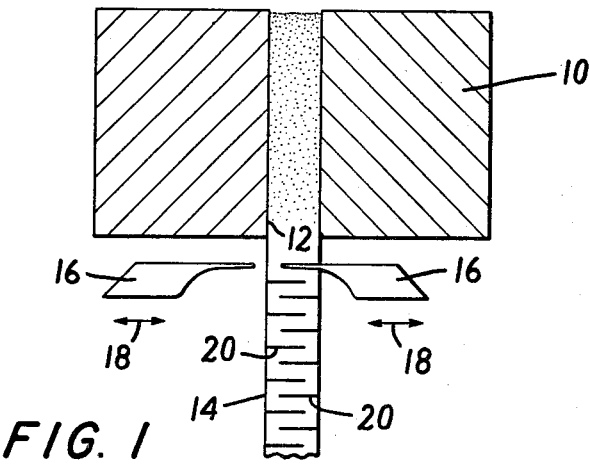
FIG. 1 is a schematic side view of a die and associated cutting means for reducing the thickness of the extruded product.
Figure 2:
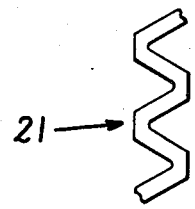
FIG. 2 is a partial schematic view showing the way in which the partially severed product of FIG. 1 is unfolded.

Referring now to FIG. 1, there is seen a die 10 having a straight orifice 12 through which a solid sheet 14 of polymer is extruded with the predetermined thickness shown in the drawing. The die 10 is fed molten polymer under pressure by conventional means (not shown) such as a screw extruder. Positioned below orifice 12 and adjacent the extruding sheet 14 are a plurality of knives 16 (two only shown) which are reciprocated in unison in the direction of the arrows 18 by conventional means, such as a rack and pinion arrangement (not shown). Knives 16 are moved into and out of the extruding sheet to partially sever the sheet. The cuts thus made penetrate into the sheet to the depth indicated by lines 20 and the cuts extend throughout the width of the sheet. The partially severed sheet is then unfolded in the axial direction as shown in FIG. 2 whereby a sheet 21 having less thickness than the originally extruded sheet is produced. To produce a sheet having a uniform thickness, the distance between successive cuts and the uncut wall thickness must be equal.

The hot polymer immediately below the die is not yet permanently set and the weight of the material will tend to unfold the cut sheet into the corrugated form shown in FIG. 2. When a flat sheet is desired, tension is applied to the severed sheet as for example by conventional grippers or rolls which straighten out the corrugation and produce a flat sheet (not shown). In such case, the polymer takes its final set while the sheet is held flat under tension. Alternately, the corrugated sheet of FIG. 2 may be reheated and held flat under tension until the polymer cools and sets in the form of a flat sheet.

Figure 3:
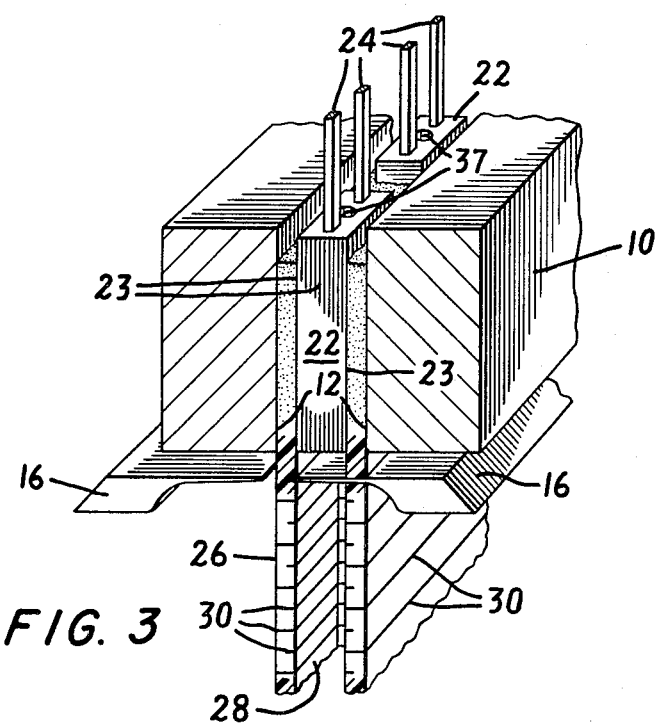
FIG. 3 is a schematic isometric view of an apparatus for making a flat net.

In the apparatus shown in FIG. 3, a plurality of spaced solid rectangular blocks 22 (two only shown) are mounted in the orifice 12 to partially obstruct it. The blocks 22 are held in place preferably by an overhead support 24 in position within the orifice so as to permit polymer to flow around the four vertical sides 23 of each block. In this manner, a sheet 26 is extruded having a plurality of bores 28 therein (one only shown) extending axially along the length of the extruded sheet.

Figure 4:
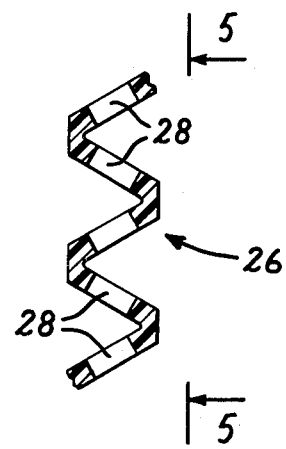
FIG. 4 is a partial schematic view showing the way in which the partially severed sheet of FIG. 3 is unfolded to form a net.
Figure 5:
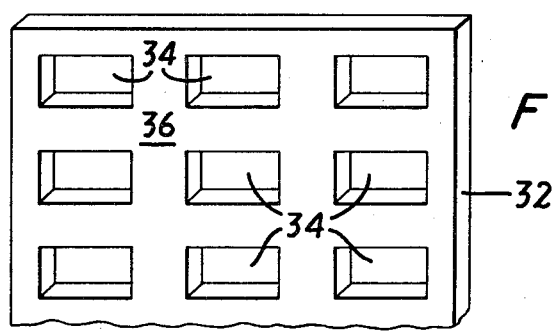
FIG. 5 is a front view of a net made with the apparatus of FIG. 3 taken along line 5—5 of FIG. 4.

Knives 16 are reciprocated in unison as described in the FIG. 1 embodiment to partially sever the extruding sheet along lines 30. By reciprocating the knives in unison, the sheet is partially severed first on one side and then on the other. Each knife cuts through the bores and partially into the opposite wall of the sheet. The partially severed sheet is then unfolded in the axial direction as shown in FIG. 4 until it is a flat sheet 32 as seen in FIG. 5. The flat sheet 32 has a plurality of rectangular openings 34 therein surrounded by solid polymer 36. The net thus produced has very good physical strength characteristics due to the unbroken continuous extrusion of a single sheet of plastic within which the openings are formed as compared to the extrusion of a plurality of separate strands of polymer which are joined together in predetermined manner to form the net structure.

The openings 34, although shown as rectangular, may be any shape such as square, diamond, etc. The shape of the opening depends solely on the shape of the solid block 22. For instance, if a diamond opening is desired, then a diamond shaped block is used.

As in the FIG. 1 embodiment, if a flat sheet 32 having uniform thickness is desired, the distance between successive cuts and the uncut wall thickness of the extruding sheet 26 (FIG. 3) must be equal. If a different thickness flat sheet is desired, then either the rate of extrusion may be increased or the rate of reciprocation of the knives may be varied by conventional means (not shown).

In most instances, partially severing the sheet on both sides through the bore will permit the pressure within the bore to come into equilibrium with the pressure of the surrounding atmosphere to prevent collapse of the sheet. If there is no such venting to the atmosphere, the pressure within the bore will become greater than that of the atmosphere and the sheet may rupture. This is readily prevented by venting the bore by means of an opening 37 in the block which is vented to the atmosphere as by a conventional pipe or manifold (not shown) to reduce the pressure within the bore. If desired, additional openings may be provided in the block of the die to circulate fluid for heating or cooling the extruded polymer product to control and adjust the temperature of the extruded product.

Figure 6:
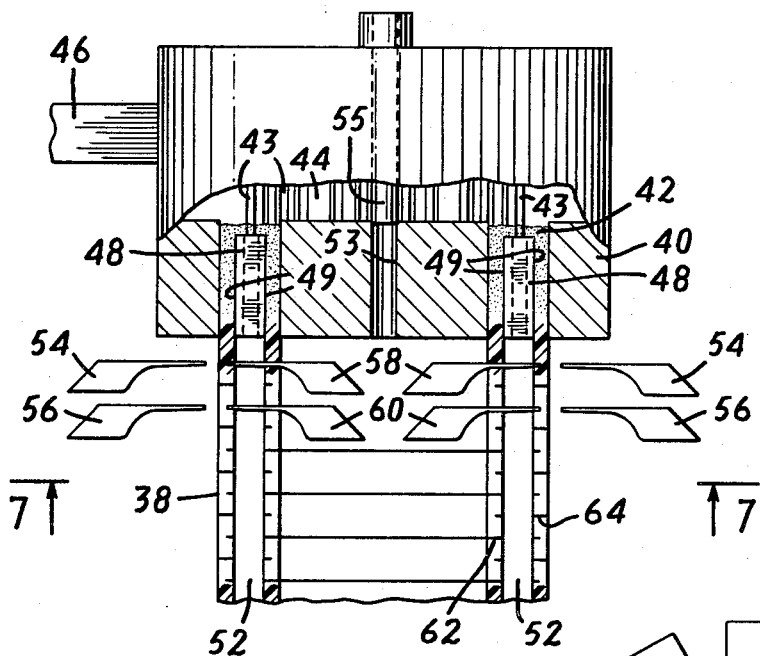
FIG. 6 is a plan view of an apparatus for making a tubular net.

The apparatus of FIG. 6 is adapted for the extrusion of a tube of polymer 38. The tube 38 is extruded from a die 40 which has an annular orifice 42 in fluid communication with a polymer filled cavity 44. Polymer is delivered to the cavity under pressure from conventional means (not shown) such as a screw extruder, through a feed line 46. A plurality of blocks 48 circumferentially spaced from each other are held in position within the orifice 42 as by means of an overhead support 43. Polymer flows around and encompasses the four vertical sides 49 of each block 48. The blocks, as in the previous embodiment, form a plurality of continuous bores 52 within the wall of the extruding tube. The shape of the bores is determined by the shape of the blocks. The blocks 48 may be vented to atmosphere to prevent collapse of the tube walls in the same manner and for the same reasons as given above in connection with the FIG. 3 embodiment. In addition, the interior of the tube 38 may also be vented to prevent collapse of the tube by providing a bore 53 within the die 40 which is vented to atmosphere through pipe 55 or connected to a suitable depressurizing means, such as a vacuum pump (not shown).

Figure 7:
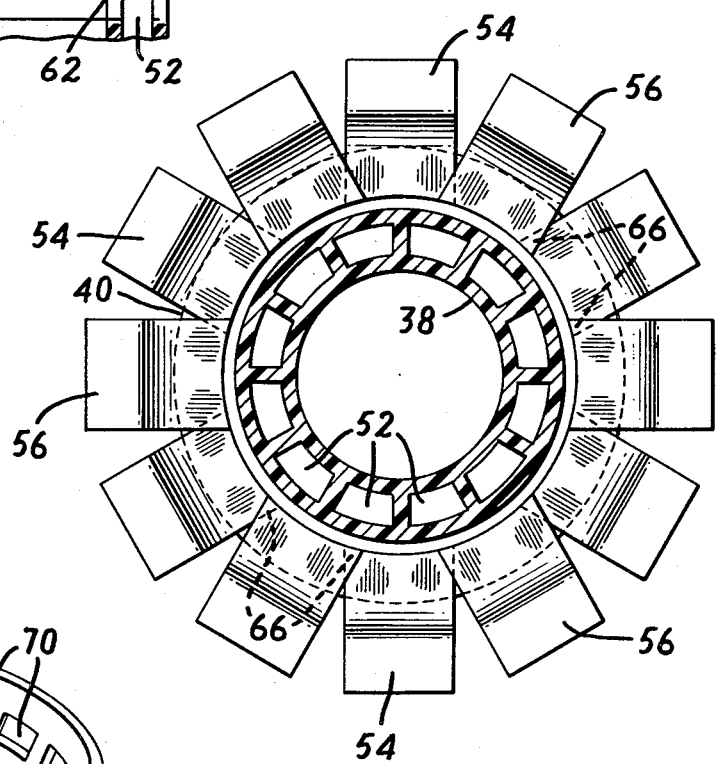
FIG. 7 is a partial bottom view of the apparatus of FIG. 6 taken along line 7—7 and in which the inner knives have been omitted for clarity.

Positioned below the orifice 42 are two rings of outer reciprocable knives 54 and 56 and two rings of inner reciprocable knives 58 and 60 respectively. Rings 54 and 58 are positioned opposite each other as are the rings 56 and 60. Each pair of knives are reciprocated in unison to partially sever the tube along the circumferential lines 62 and 64. As best shown in FIG. 7, each knife or row 54 is circumferentially spaced from the next adjacent knife and the gap between each knife is filled by a knife in row 56 to permit movement of the knives towards and away from the polymer tube without interfering with each other. Each ring of knives may be mounted in a conventional power operated chuck (not shown) to control the reciprocal movement of the knives. In order to produce a net structure from the extruding tube, the cuts made along lines 62 and 64 must form a complete circle. The circumferential spacing between the knives is such as to permit a small amount of overlap 66 in the cuts made by the knives of both rings. In this way, the cut made along 64 is a two step cut performed first by the knives in ring 54 and completed by the knives in ring 56. The rate at which the polymer is extruded is synchronized with the movement of the knives so as to position the cut of each ring of knives in line to form a complete circular cut which partially severs the wall of the tube. To aid in achieving this, a conventional pinch roller (not shown) or any other mechanism capable of applying tension to the extruded tube may be used to help regulate the speed at which the tube moves past the knives. As many rings of knives as desired may be used to thus partially sever the tube wall.

Knives 58 and 60 will operate in exactly the same manner as described above for knives 54 and 56 to partially sever the wall of tube 38 along line 62.

Figure 8:
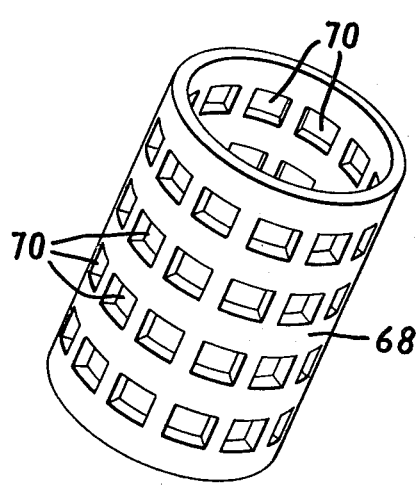
FIG. 8 is an isometric view of a tubular net structure produced by the apparatus of FIG. 6.

After the tube has been partially severed, it is unfolded by pulling it axially as described above for the FIG. 3 embodiment whereby a tubular net 68 having open rectangular holes 70 is achieved (FIG. 8). If a flat sheet of net is desired the tube is slit along a vertical line and unfolded into a flat sheet. The shape of the holes is determined by the shape of the blocks 48. If blocks 48 are diamond shaped rather than rectangular then holes 70 will also be diamond shaped rather than rectangular. Also, as earlier described, to achieve a tubular net having uniform wall thickness, the distance between successive cuts 62, 64 are made equal to the uncut wall depth.

Any shape tube such as a rectangular tube may be extruded and made into a net structure by the above-described method and apparatus as long as the knives used conform to the shape of the extruded tube.

Figure 9:
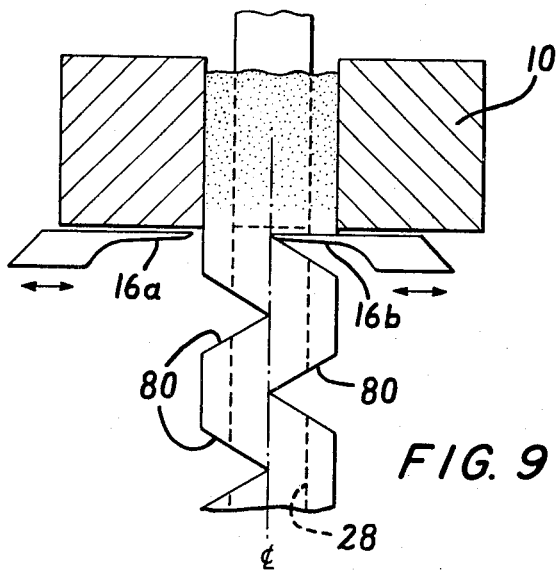
FIG. 9 is a schematic view of the die of FIG. 3 which illustrates how the knives may be used to cut off and interrupt the flow of polymer through a limited area of the opening in the die to form a double wall net.

The apparatus of FIG. 9 illustrates the way in which the knives are employed for obstructing a selected portion of the opening of the die to cut off the flow and provide voids or cuts in the extruded product. The extrusion die 10 is identical to that shown in FIG. 3. In this embodiment however the knives 16a and 16b are mounted in conventional manner to slide in contact with the lips at the opening in the die. As shown in the drawing when a knife blade such as 16b is moved to the left is obstructs the opening in the die to form a cut-out or void 80 in the extruded product. In the embodiment shown the knife blade 16b is periodically moved to the left in FIG. 9 until the blade closes off one half of the opening in the die. In similar manner the knife 16a is periodically moved to the right in FIG. 9 to obstruct the other one half of the die and as a result voids are periodically formed in opposite sides of the extruded tube. Since each of the voids are in open communication with the bores 28, a double wall net is formed as illustrated in the drawing. The knives may be moved in any desired manner and they need not be synchronized to form the symmetrical product shown in the drawings. The particular shape of each void is a function of the speed of movement of the knife relative to the speed at which the tube is extruded from the die. A change in the relative speed between the knife and rate of product extrusion will of course result in a change in the shape of the void which may be given any desired shape or configuration. The voids 80 are formed by moving the knives in and out at a uniform speed. This is not necessary and the knife may move at a variable speed with periods of dwell to change the configuration of the voids 80 in any desired manner.

The extent to which the die opening is obstructed may also be changed. For example, the product illustrated in FIG. 4 may be formed by moving each knife blade into the die far enough so as to partially obstruct and cut into the opposite wall of the product as illustrated in FIG. 3. Alternatively, the knife blade need only cut into a wall of the product to the extent necessary to have an open communication between the cut and the open bore 28. Such a product is illustrated in FIGS. 10 and 11.

Figure 10:
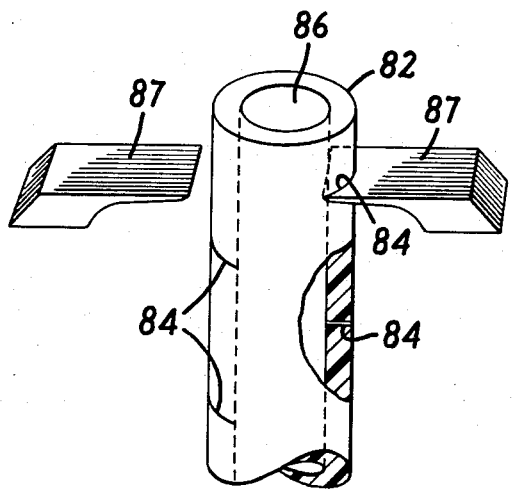
FIGS. 10 through 13 illustrate modified double wall net structures.
Figure 11:
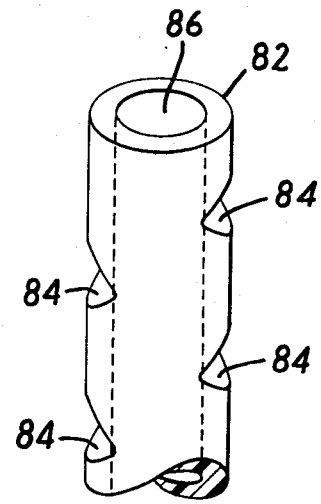

The tube of extruded polymer 82 shown in FIG. 10 may be extruded by the apparatus of FIG. 6 by removing the blocks 48 from the opening in the die so that a solid wall tube will be extruded. Slits 84 are cut into the wall of the tube to the extent necessary to provide open communication between the slit and opening 86 inside the tube. For this purpose it is only necessary to use a single knife 87 positioned on opposite sides of the tube for slitting a limited portion of the tube wall on opposite sides thereof. In some applications it may be desirable to employ the slitted tube without opening the slits. Or if the open slits of FIG. 11 are desired, it is only necessary to permanently stretch the tube in conventional manner to increase its length up to two and one-half to five times the extruded length. The increase in length will cause the slits 84 to open into the configuration shown in FIG. 11 to provide a double walled net. The configuration shown in FIG. 11 may also be obtained without stretching the tube. This may be done by obstructing the opening in the die at selected points in the manner previously described in connection with FIG. 9.

It will also be noted that the cuts need not be positioned on opposite sides of the wall of the tube but may be scattered heterogeneously throughout the surface of the extruded product by using a plurality of single knives positioned in selected scattered locations around the tube and by moving the knives in a regular or irregular manner to slit the tube.

Surface decoration is achieved by using small knife points to cut the surface as by scratching or gouging out portions of the surface or by otherwise disrupting the surface of the product. Any desired aesthetic effect may be achieved by selection of knife configuration and manipulation of the blade. In the above description the manipulation of the knives has been related to one or more of the physical embodiments shown in the drawings, but it will be understood that the described manipulation may be employed in connection with all of the various types of extrusion apparatus by modifying the knife and its manipulation as described hereinabove.

Figure 12:
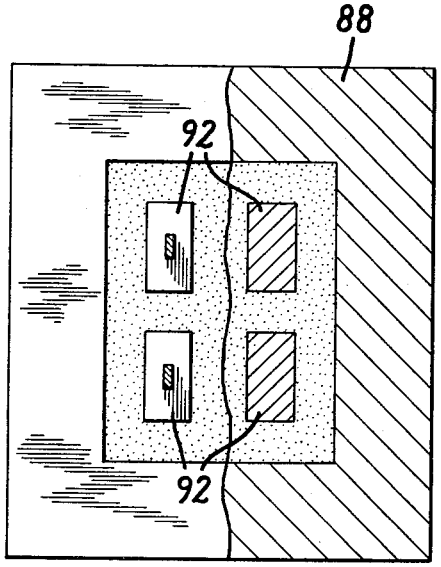
Figure 13:
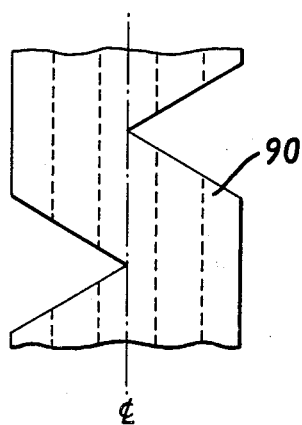

Multiple products may be formed by combining two or more of the basic products as illustrated in FIGS. 12 and 13. As shown in FIG. 12, the extruded product is formed by means of a die 88 which is identical with the die of FIG. 3 except that the die 88 as seen from the top will extrude a solid walled product 90 having four open bores each of which is formed by a block 92. The extruded product may be slit or cut in any desired manner. FIG. 13 illustrates the product extruded through the die of FIG. 12 when cut in the manner described in connection with the apparatus of FIG. 9 to form a multiple product having a structure honeycombed with holes.

In the apparatus of FIGS. 3 and 6, very rapid movement of the knives may be employed to provide a clean slit that does not disrupt the wall of the extruded product. However, if the slit is not a clean cut, it may then be desirable to move the knives in step with the longitudinal movement of the extruded product by conventional means in those cases where a clean slit is desired without otherwise disrupting the wall of the product.

While the invention has been described in connection with product immediately after extrusion, it will be understood that the cutting operation may be employed separately from the extrusion process and the various products may be performed and cut at some point in time subsequent to the extrusion. While the description emphasizes the importance of the invention in connection with extruded plastic materials, it will be understood that any extrudable material may be cut and extruded in accordance with the present invention. It will also be understood that rotating knife blades on an eccentric mount may be employed in place of the reciprocating knives described in connection with the drawings.

It is intended to cover all changes and modifications of the preferred embodiments of the invention herein chosen for the purpose of illustration which do not constitute departures from the spirit and scope of the invention.

What is claimed is:

1. A method for producing a perforated thermoplastic sheet comprising:
    a. melt extruding a sheet of thermoplastic in the form of a closed annular configuration whereby a tube is extruded having an interior wall and an exterior wall, the opposing walls of the sheet being the said interior wall and the said exterior wall of the tube;
    b. continuously obstructing the flow of polymer during extrusion in one or more predetermined locations to form at least one axially extending bore within the sheet of extruded thermoplastic and between the two opposing walls;
    c. alternately cutting into one opposing wall and then into the other opposing wall, each cut:
        i. completely severing the wall on the side of the cut,
        ii. establishing communication between the cut and the bores, and
        iii. partially but not completely severing the wall opposite the completely severed wall with respect to the cut made in the completely severed wall;
    d. unfolding the cut sheet whereby a perforated sheet is formed.

2. A method as specified in claim 1 further including the step of first partially cutting into one side of said product a predetermined distance and then partially cutting into said product on the other side to said predetermined distance and spacing said cuts a distance approximately equal to the remaining wall thickness whereby when said product is unfolded the wall thickness of the net is uniform throughout.

3. A method as specified in claim 1 further comprising the step of maintaining the pressure within said bore equal to atmospheric pressure.

4. A method as specified in claim 1 further including the step of maintaining the pressure within said tube at atmospheric pressure.

5. The method specified in claim 1 which includes the step of permanently stretching the product after it is cut to open the cuts therein.

* * * * *